US008581783B2

(12) United States Patent
Higgins

(10) Patent No.: US 8,581,783 B2
(45) Date of Patent: Nov. 12, 2013

(54) METAMATERIAL-BASED DIRECTION-FINDING ANTENNA SYSTEMS

(75) Inventor: J. Aiden Higgins, Westlake Village, CA (US)

(73) Assignee: Teledyne Scientific & Imaging, LLC, Thousand Oaks, CA (US)

( * ) Notice: Subject to any disclaimer, the term of this patent is extended or adjusted under 35 U.S.C. 154(b) by 252 days.

(21) Appl. No.: 13/045,014

(22) Filed: Mar. 10, 2011

(65) Prior Publication Data

US 2012/0229339 A1 Sep. 13, 2012

(51) Int. Cl.
G01S 5/04 (2006.01)

(52) U.S. Cl.
USPC .......................................... 342/449; 342/443

(58) Field of Classification Search
USPC ........... 342/417, 430, 443, 449; 343/700 MS, 343/754, 844, 909
See application file for complete search history.

(56) References Cited

U.S. PATENT DOCUMENTS

| | | | | |
|---|---|---|---|---|
| 5,239,311 | A | 8/1993 | Arimura et al. | 343/771 |
| 6,567,053 | B1 | 5/2003 | Yablonovitch et al. | 343/767 |
| 6,734,827 | B2 | 5/2004 | Killen et al. | 343/792.5 |
| 6,791,432 | B2 | 9/2004 | Smith et al. | 333/99 |
| 6,859,114 | B2 | 2/2005 | Eleftheriades et al. | 333/156 |
| 6,876,337 | B2 | 4/2005 | Larry | 343/818 |
| 6,906,667 | B1 | 6/2005 | Poilasne et al. | 343/700 |
| 6,919,857 | B2 | 7/2005 | Shamblin et al. | 343/795 |
| 6,958,729 | B1 | 10/2005 | Metz | 343/700 |
| 7,012,568 | B2 | 3/2006 | Desclos et al. | 343/700 |
| 7,068,234 | B2 | 6/2006 | Sievenpiper | 343/745 |
| 7,135,917 | B2 | 11/2006 | Kozyrev et al. | 330/4.7 |
| 7,218,285 | B2 | 5/2007 | Davis et al. | 343/754 |
| 7,265,730 | B2 | 9/2007 | Iizuka et al. | 343/802 |
| 7,307,589 | B1 | 12/2007 | Gregoire et al. | 343/700 |
| 7,453,413 | B2 | 11/2008 | Larry et al. | 343/834 |

OTHER PUBLICATIONS

Caloz, Christophe, et al. "Metamaterials for High-Frequency Electronics", Proceedings of the IEEE, vol. 93, No. 10, Oct. 2005, pp. 1744-1752.
Song, Seong-Sik, "RF Modeling of an MOS Varactor and MIM Capacitor in 0.18-um CMOS Technology", Journal of the Korean Physical Society, vol. 41, No. 6, Dec. 2002, pp. 922-926.
Chen, Tai-Lee, et al., "Dual-Beam Microstrip Leaky-Wave Array Excited by Aperture-Coupling Method", IEEE Transaction on Antennas and Propagation, vol. 51, No. 9, Sep. 2003, pp. 2496-2498.
Sanada, Atsushi, "Characteristics of the Composite Right/Left-Handed Transmission Lines", IEEE Microwave and Wireless Components Letters, vol. 14, No. 2, Feb. 2004, pp. 68-70.

*Primary Examiner* — Dao Phan
(74) *Attorney, Agent, or Firm* — Koppel, Patrick, Heybl & Philpott

(57) ABSTRACT

Method embodiments are disclosed to determine arrival directions of electromagnetic signals that have a known signal frequency and a known guided signal wavelength. These methods are realized with an antenna configured to define, at the signal frequency, at least one metamaterial cell between first and second signal ports. They then include the step of rotating the antenna until the differential power from the first and second signal ports is substantially zero and then determining the arrival direction as a normal to the metamaterial cell. In other method embodiments, the antenna is stationary and a differential power is determined wherein the differential power is defined as the difference between received powers from the first and second ports. The arrival direction of electromagnetic signals are then determined from the differential power.

17 Claims, 3 Drawing Sheets

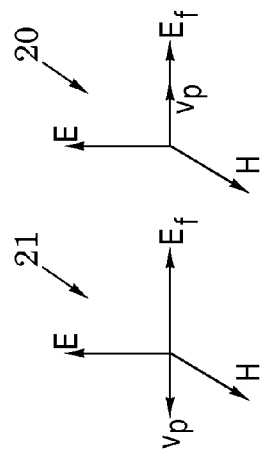
FIG. 1
(PRIOR ART)
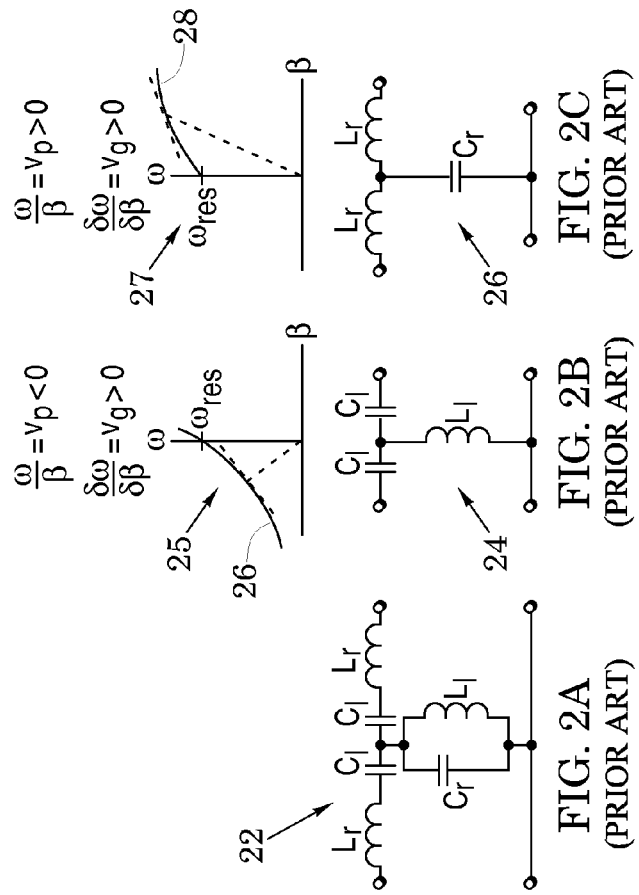
FIG. 2A (PRIOR ART)
FIG. 2B (PRIOR ART)
FIG. 2C (PRIOR ART)
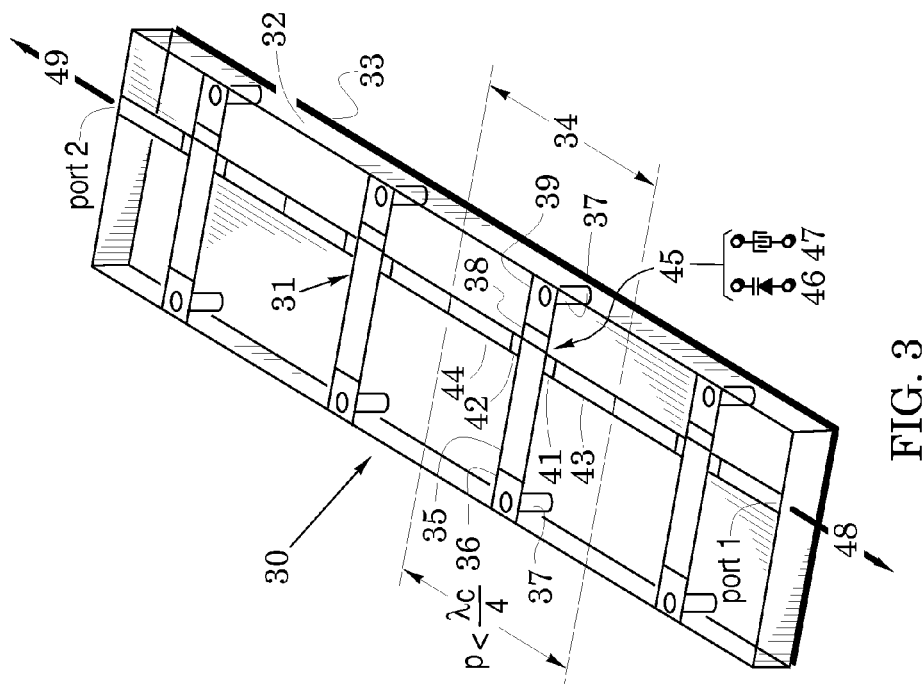
FIG. 3

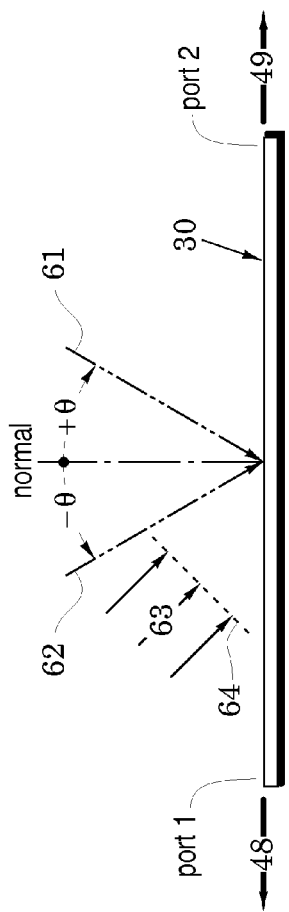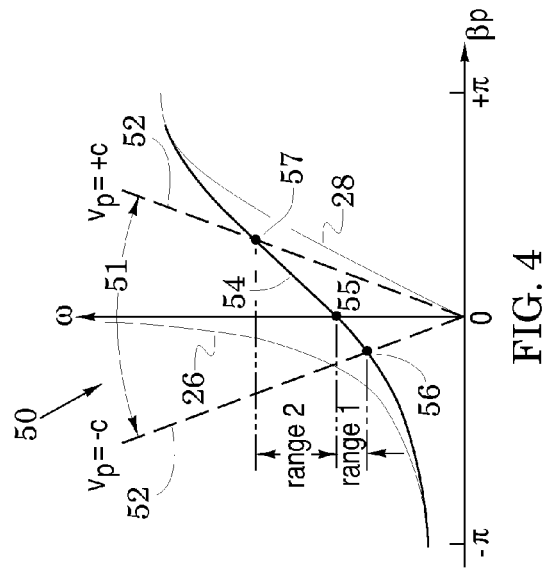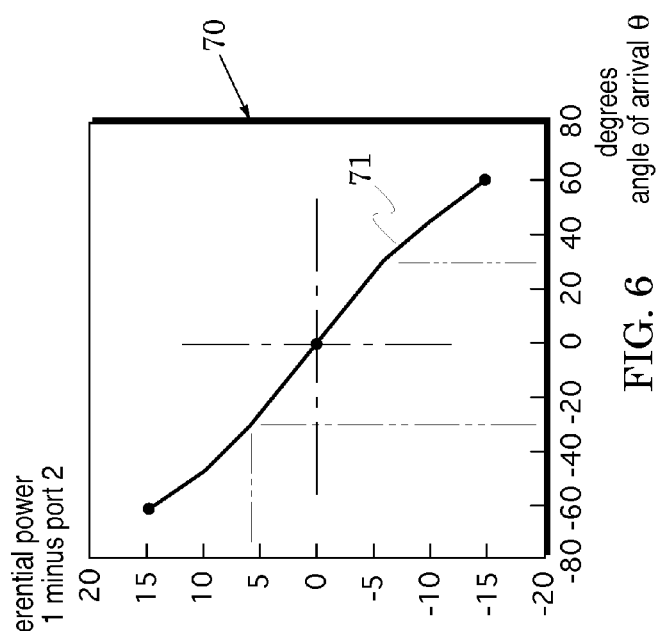

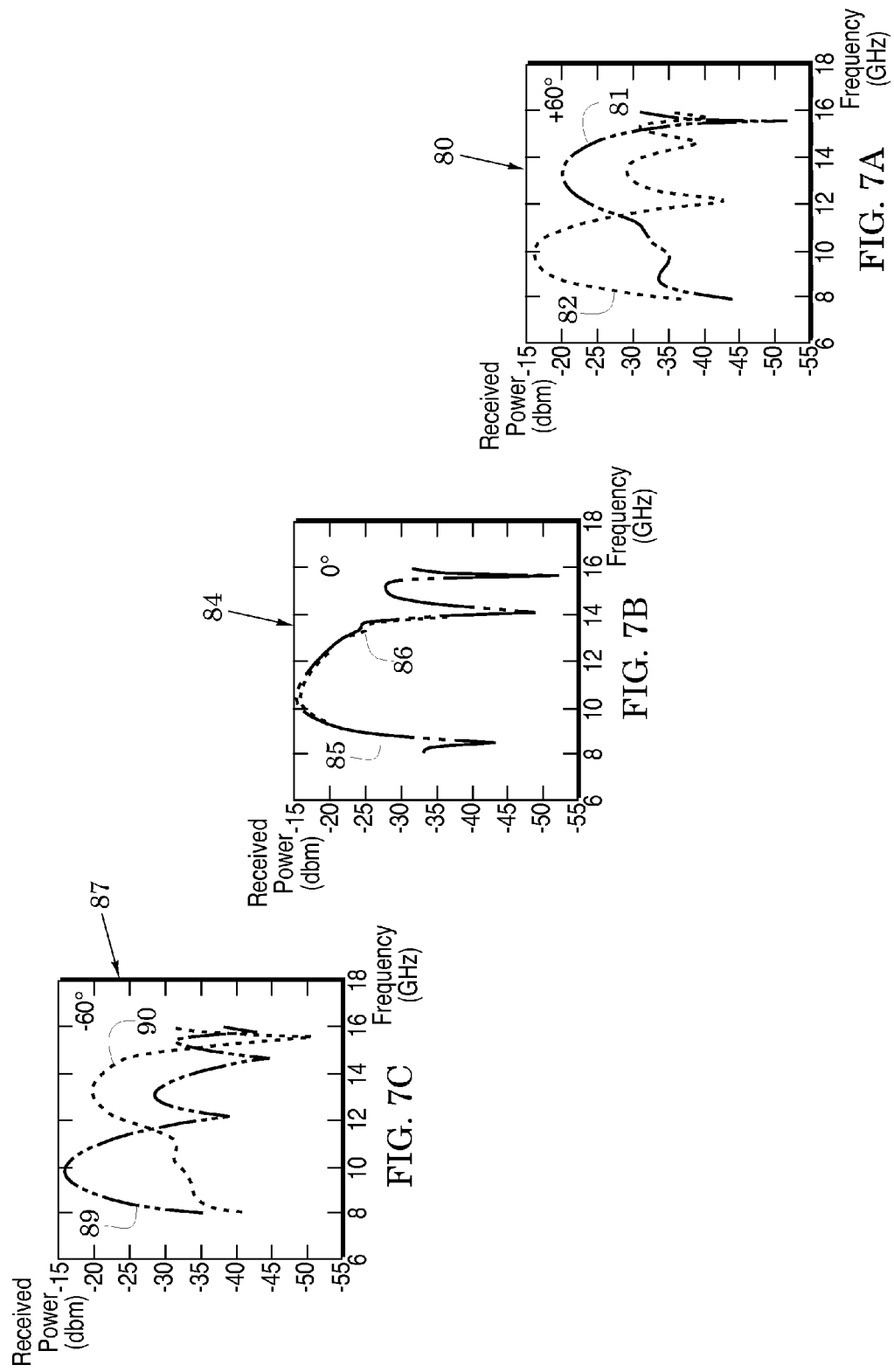

METAMATERIAL-BASED DIRECTION-FINDING ANTENNA SYSTEMS

BACKGROUND OF THE INVENTION

1. Field of the Invention

The present invention relates generally to antennas.

2. Description of the Related Art

Metamaterials are structures engineered to have features of a size substantially less than that of an associated electromagnetic guided wavelength and configured to obtain negative permittivity, permeability and refractive index with that radiation.

In an electromagnetic wave, phase velocity is the velocity of the peaks of the wave traveling through a medium. In contrast, group velocity refers to a signal that is composed of electromagnetic waves within a frequency band and it is the velocity with which the entire group of frequencies travel, i.e. the signal energy flow. The group velocity cannot exceed the speed of light and the progression of an electromagnetic wave through a particular medium is dependent on the permittivity and permeability of the medium.

Permittivity relates to the medium's ability to transmit or "permit" an electric field. In particular, permittivity $\in$ of a medium is defined as the ratio of the flux density produced by an electric field across that medium to the flux density produced by the same field in a vacuum. Permeability $\mu$ is the measure of the ability of a medium to support the formation of a magnetic field. If either but not both of the permittivity and permeability of a medium is negative, electromagnetic fields will not propagate but, rather, will decay exponentially into the medium.

If, however, the permittivity and permeability are both positive, the product $\in\mu$ is positive and electromagnetic waves will propagate through the medium. In this case direction of the phase velocity $v_p$ is in the same direction as the energy flow $E_f$ and this latter direction is defined by the cross product of the electric and magnetic fields E and H as shown in the graph 20 of FIG. 1. Such a medium is termed a right-handed (RH) medium. If the permittivity and permeability are both negative, the product $\in\mu$ is again positive and electromagnetic waves will propagate through that medium. In this case, however, the direction of the phase velocity $v_p$ is opposite to the direction of the energy flow, i.e., the group velocity, as shown in the graph 21 of FIG. 1. Such a medium is termed a left-handed (LH) medium.

The refractive index n of a medium is defined as the phase velocity of an electromagnetic wave in vacuum divided by its velocity in the medium. Because the phase velocity direction is opposite the energy flow direction in a left-handed medium, this medium has a negative refractive index. As a consequence, a diverging lens of a right-handed material acts a converging lens when formed with a left-handed material and a converging lens of a right-handed material acts a diverging lens when formed with a left-handed material.

Dispersion is the phenomenon in which the phase and group velocities of an electromagnetic wave in a medium are a function of the frequency of the wave. A familiar result of dispersion is that of a rainbow in which dispersion causes white light to be spatially separated into light of different colors.

A compound right/left handed (CRLH) unit cell 22 of a transmission line is shown in FIG. 2A to comprise series arms on each side of a shunt arm wherein each of the series arms are formed with a series arrangement of an inductor $L_r$ and a capacitor $C_l$ and the shunt arm is formed with a parallel arrangement of an inductor $L_l$ and a capacitor $C_r$.

At a resonant angular frequency $\omega_{res}$ common to both the series and shunt arms, the series arms have a zero reactance and the shunt arm has an infinite reactance. Below $\omega_{res}$ however, the unit cell 22 essentially reduces to the high-pass structure 24 of FIG. 2B that is formed by the left-handed components $C_l$ and $L_l$ of the unit cell 22. Above $\omega_{res}$, the unit cell 22 essentially reduces to the low-pass structure 26 of FIG. 2C that is formed by the right-handed components $C_r$ and $L_r$ of the unit cell.

A dispersion graph 25 in FIG. 2B plots angular frequency $\omega$ (radians per second) as a function of a propagation constant $\beta$ (radians per the unit cell of the transmission line). A solid-line plot 26 in this graph shows the dispersion for frequencies less than $\omega_{res}$ and shows that the phase velocity $v_p$ ($\omega/\beta$) of the high-pass structure 24 is negative and rises to the resonant angular frequency $\omega_{res}$. The slope of a broken line from the origin of the graph 25 to a point on curve 26 represents the phase velocity at that point (frequency) on the plot 26 and the slope of a broken line tangent to the curve at that point represents the group velocity $v_g$ ($\delta\omega/\delta\beta$).

In a similar graph 27 in FIG. 2C, a solid-line plot 28 shows the dispersion for frequencies greater than $\omega_{res}$ and shows that the phase velocity $v_p$ of the low-pass structure 26 is positive and is in the same direction as group velocity i.e. both slopes are positive. Again, the slope of a broken line from the origin of the graph 27 represents the phase velocity at a particular point (frequency) on the curve 28 and the slope of a broken line tangent to the curve at that frequency represents the group velocity $v_g$.

In the dispersion graph 25, the phase velocity is negative but the group velocity is positive. This indicates a non-evanescent backward wave in which permittivity and permeability are both negative so that we have the dispersion of an LH transmission line. In the dispersion graph 27, the phase velocity and group velocity are both positive. This indicates a forward wave in which permittivity and permeability are both positive so that we have the normal dispersion of an RH transmission line. Phase velocity at the resonant angular frequency $\omega_{res}$ approaches infinity in the limit so that wavelength also approaches infinity.

BRIEF SUMMARY OF THE INVENTION

Embodiments of metamaterial antenna structures and methods are provided. The drawings and the following description provide an enabling disclosure and the appended claims particularly point out and distinctly claim disclosed subject matter and equivalents thereof.

BRIEF DESCRIPTION OF THE DRAWINGS

FIG. 1 illustrates phase velocity, energy flow, electric field and magnetic field in RH and LH mediums;

FIG. 2A illustrates a composite right/left handed unit cell of a transmission line;

FIG. 2B illustrates a high-pass portion of the unit cell of FIG. 2A and a corresponding dispersion graph;

FIG. 2C illustrates a low-pass portion of the unit cell of FIG. 2A and a corresponding dispersion graph;

FIG. 3 illustrates a direction-finding antenna system embodiment;

FIG. 4 illustrates a dispersion diagram applicable to a metamaterial cell in the antenna system of FIG. 3;

FIG. 5 is a side view of the antenna system of FIG. 3 that defines angle of arrival of signals;

FIG. 6 is a graph that illustrates differential power at ports of the antenna system of FIGS. 3 and 5 relative to the angle of arrival of an electromagnetic signal; and FIGS. 7A-7C are graphs of relative power at ports of the antenna system of FIGS. 3 and 5 as a function of the frequency of received electromagnetic signals.

DETAILED DESCRIPTION OF THE INVENTION

FIGS. 1-7C illustrate a method embodiment to determine arrival directions of electromagnetic signals that have a signal frequency and signal wavelength. These methods are realized with an antenna configured to define, at the signal frequency, at least one metamaterial cell between first and second signal ports. They then include the step of rotating the antenna until the differential power from the first and second signal ports is substantially zero and then determining the arrival direction as a normal to the metamaterial cell.

FIGS. 1-7C further illustrate another method embodiment in which the antenna is stationary and a differential power is determined wherein the differential power is defined as the difference between received powers from the first and second ports. The arrival direction of electromagnetic signals are then determined from the differential power.

These exemplary methods are particularly suited for use with microstrip structures that form metamaterial cells which are cells that each have a length p that is less than a quarter of the signal wavelength wherein that wavelength is primarily determined by parameters of the substrate such as its thickness and its dielectric constant.

In particular, an embodiment 30 of a metamaterial-based direction-finding antenna system embodiment is illustrated in FIG. 3 wherein the system is designed to operate in a band of frequencies around a center frequency $f_c$. The system is formed as a microstrip structure 31 that includes a dielectric substrate 32 positioned over a metallic ground plane 33. The illustrated system is formed with four metamaterial cells 34 which are cells that each have a length p that is less than a quarter of an operational wavelength $\lambda_c$ at an operational center frequency $f_c$ wherein the wavelength $\lambda_c$ is primarily determined by parameters of the substrate 32 (e.g., its thickness and its dielectric constant). As shown in FIG. 3, the metamaterial cells 34 are arranged in series along the length of the substrate and between ports 1 and 2 at opposite ends of the antenna system.

In each of the metamaterial cells 34, a first strip 35 is arranged transversely over the substrate 32 to contact a first pad 36 near a first edge of the substrate wherein the pad is coupled through the substrate to the ground plane 33 by a metallic via 37 that extends downward through the substrate. A first varactor diode 38 is coupled between the first strip 35 and a second pad 39 that is adjacent a second edge of the substrate and also coupled to the ground plane 33 through a via 37. The strip 35 and varactor diode 38 are thus arranged to realize the parallel arrangement of a shunt inductor $L_l$ and a shunt capacitor $C_r$ that is shown in the metamaterial cell 22 of FIG. 2A.

Also in each of the metamaterial cells 34, second and third varactor diodes 41 and 42 are coupled to opposite sides of the junction between the first strip 35 and the first varactor diode 38 to provide the series capacitive elements $C_l$ shown in the metamaterial cell 22 of FIG. 2A. Finally, second and third strips 43 and 44 are arranged longitudinally and respectively coupled to the varactor diodes 41 and 42 to thereby provide the series inductors $L_r$ of FIG. 2A.

A substitution arrow 45 in FIG. 3 shows that, although the metamaterial cells have been described above to include varactor diodes (as symbolized by a varactor diode 46), they may be realized by other microstrip structures such as a capacitor 47 realized with interdigitated fingers.

The varactor diodes 38, 41 and 42 not only provide the capacitive elements similar to those of the metamaterial cell 22 of FIG. 2A but permit electronic tuning of the center frequency $f_c$ of the metamaterial cell 34 if that is found necessary. The shunt arm formed by the first strip 35 and first varactor diode 38 is tuned to resonance at the center frequency $f_c$ and the series arms formed by the second and third strips 43 and 44 and second and third varactor diodes 41 and 42 are also tuned to resonance at the same center frequency $f_c$. This condition of coincident center frequencies is the "balanced condition" necessary to assure proper functioning of the antenna system 30.

Although the antenna system 30 of FIG. 3 is shown to have four of the metamaterial cells 34, other antenna system embodiments may have other numbers of metamaterial cells. The number (and, hence, the length of the antenna system) can be chosen to determine antenna parameters such as operational beam width. It is noted that the dielectric substrate 32 in FIG. 3 has been drawn as though it were transparent in order to enhance the visibility of the structures of the antenna system.

FIG. 4 shows a dispersion diagram 50 applicable to each metamaterial cell 34 of the antenna system 30 of FIG. 3. In this diagram, radial frequency ω is plotted as a function of βp wherein β represents dispersion and p is the physical period of the periodic structure of the system (i.e., p is the metamaterial cell length in FIG. 3). A radiation cone 51 is defined between broken lines 52 that indicate the relationship between frequency and a propagation constant $κ_0$ for free space. Thus, the slope of the broken lines 52 indicate a constant phase velocity equal to the free-space velocity of light c. Radiation at a specific frequency will occur when the dispersion β is smaller than the propagation constant $k_0$, i.e., for those frequencies for which the dispersion is inside the cone 51.

The dispersion curve 54 is applicable to the metamaterial cells of the antenna system 30 of FIG. 3 and essentially represents a combination of the dispersion curves 26 and 28 of FIGS. 2B and 2C in the balanced condition where the resonant angular speed $ω_{res}$ is the same for both. The plots 26 and 28 respectively apply to a left-handed (LH) structure and a right-handed (RH) structure whereas the dispersion curve 54 applies to a compound right/left handed (CRLH) structure.

The frequency at point 55 where the dispersion curve 54 is at the point where the function βp is zero, is the resonance frequency $f_c$ of the series arms (the second varactor diode 41 and the second strip 43 of and the third varactor diode 42 and the third strip 44) of FIG. 3 and equals the resonance frequency in the shunt arm (the first varactor diode 38 and the first strip 35) of FIG. 3. At this frequency $f_c$ the wavelength is infinite and radiation from the antenna system 30 of FIG. 3 is normal to the substrate 32 and the elevation angle θ is zero (elevation angle defined as deviation from normal as in FIG. 5).

The frequency band over which reception by the antenna system 30 is possible extends from the point 56 (where the dispersion curve 54 enters the radiation cone 51) to the point 57 (at which the dispersion curve exits the radiation cone 51). Signals whose frequencies are within "range 1" in FIG. 4 are those signals for which phase velocity and group velocity are opposed so that these signals support backward waves. In the frequency band labeled "range 2" phase velocity and group velocity are coincident and signals with these frequencies support forward waves.

FIG. 5 is a side view of the antenna system 30 of FIG. 3 showing port 1 to the left and port 2 to the right. This figure defines an angle of arrival at the antenna system of an incident electromagnetic signal. For example, a first vector 61 is shown to have an angle of arrival+θ defined relative to a direction that is normal to the plane of the system 30 and a second vector 62 has an angle of arrival−θ. To further illustrate the angle of arrival, FIG. 5 shows an incident electromagnetic signal 63 (having a wave front 64) that has an angle of arrival at the direction-finding antenna system 30 of approximately −45 degrees.

If the frequency of an incident electromagnetic signal arriving from a negative θ direction is less than the center frequency $f_c$, i.e., is in range 1 of the graph 50 of FIG. 4, it will be a backward wave in the antenna system 30 of FIG. 3 with phase velocity traveling in the direction of port 1 to port 2 and group velocity in the direction of port 2 to port 1. That is, signal power will be preferentially detected at port 1. If the frequency of the incident electromagnetic signal is greater than the center frequency $f_c$, i.e., is in range 2 of the graph 50 of FIG. 4, it will be a forward wave in the antenna system 30 with group velocity traveling in the direction of port 1 to port 2 so that the signal power will be preferentially detected at port 2.

The graph 70 of FIG. 6 illustrates differential signals that are generated in the antenna system 30 of FIGS. 3 and 5 when it is configured for resonance at a center frequency $f_c$ of 11.8 GHz and receives 10 GHz electromagnetic signals at various angles of arrival. With reference to these figures and to an arriving electromagnetic signal, a differential signal is defined as the power 48 exiting port 1 minus the power 49 exiting port 2. In accordance with this definition, a plot 71 in the graph 70 shows that a 10 MHz electromagnetic signal having an angle of arrival of approximately −30 degrees has a differential power of approximately 6 units while an electromagnetic signal having an angle of arrival of approximately +30 degrees has a differential power of approximately −6 units. For purposes of this definition, the units of power in FIG. 6 are arbitrary, e.g., they could be microwatts or milliwatts with the differential power expressed in dB.

From the graph 70, it may be seen that an important application of the antenna system 30 of FIGS. 3 and 5 is to determine arrival direction of an electromagnetic signal having a known signal frequency. In this application, an antenna system is configured to define, at the signal frequency, at least one metamaterial cell (e.g., the cell 34 in FIG. 3) between first and second signal ports (ports 1 and 2 in FIGS. 3 and 4). Then, a differential power is noted wherein the differential power is defined as the difference between received powers from the first and second ports as shown in FIG. 6. Finally, the arrival direction is determined from the differential power as exemplified by the plot 71 of FIG. 6.

The graphs 80, 84 and 87 of FIGS. 7A-7C supplement the graph 70 of FIG. 6 and further illustrate power exiting the ports 1 and 2 of the antenna system 30 of FIGS. 1 and 5 when it receives incident electromagnetic signals over a wide band of frequencies. In particular, the graphs 80, 84 and 87 respectively correspond to angles of arrival of +60, zero and −60 degrees (as shown in the upper right of each graph).

Plots 81, 85 and 89 in these graphs illustrate power of the signal 48 exiting port 1 in FIGS. 3 and 5 whereas plots 82, 86 and 90 illustrate power of the signal 49 exiting port 2. It is noted that the graphs 85 and 86 are nearly identical. To help the reader connect FIG. 6 to FIGS. 7A-7C, small dots are placed on the plot 71 of FIG. 6 at the angles of arrival of −60, zero and +60 degrees.

It may be noted from FIGS. 7A-7C that the differential power from ports 1 and 2 is zero when the angle of arrival is zero. This recognition leads to an important use of the antenna system 30 of FIGS. 3 and 5 in which it is rotated until the differential power is zero. At that point, a normal to the plane of the antenna system points to the source of the electromagnetic signal.

Examination of the graphs 80, 84 and 87 show that this use of the antenna system 30 does not work if the signal frequency is at the center frequency $f_c$ where the shunt arm and series arms of the metamaterial cells (34 in FIG. 3) are tuned to resonance because the power at ports 1 and 2 will be substantially equal at this frequency for all arrival directions. However, the center frequency $f_c$ can be easily shifted away from the signal frequency by altering tuning voltages that are applied to the varactor diodes (38, 41 and 42 in FIG. 3) of each metamaterial cell.

This shifting of the center frequency $f_c$ away from the signal frequency is also necessary when the antenna system 30 of FIGS. 3 and 5 is used as described above with reference to the graph 70 of FIG. 6 since the differential power at ports 1 and 2 will otherwise be substantially zero for all arrival directions.

The embodiments of the invention described herein are exemplary and numerous modifications, variations and rearrangements can be readily envisioned to achieve substantially equivalent results, all of which are intended to be embraced within the spirit and scope of the appended claims.

I claim:

1. A method to determine arrival direction of an electromagnetic signal having a signal frequency and a signal wavelength, comprising the steps of:
    with an antenna configured to define, at said signal frequency, at least one metamaterial cell between first and second signal ports, rotating said antenna until a differential power that is defined as the difference between received powers from said first and second ports is substantially zero; and
    determining said arrival direction as a normal to said metamaterial cell.

2. The method of claim 1, further including the step of defining said metamaterial cell as:
    first and second resonant circuits arranged in series between said first and second ports and configured to each be resonant at a center frequency that differs from said signal frequency; and
    a third resonant circuit coupled in shunt between said first and second resonant circuits and configured to be resonant at said center frequency.

3. The method of claim 2, wherein said metamaterial cell has a dimension between said first and second ports less than one fourth of said signal wavelength.

4. The method of claim 3, further including the step of defining said metamaterial cell as a microstrip circuit having a substrate with a thickness and a dielectric constant to define said wavelength and wherein said first, second and third resonant circuits each comprise:
    a metallic strip disposed over said dielectric; and
    a varactor diode coupled to said strip.

5. The method of claim 3, further including the step of defining said metamaterial cell as a microstrip circuit having a substrate with a thickness and a dielectric constant to define said wavelength and wherein said first, second and third resonant circuits each comprise:
    a metallic strip disposed over said dielectric; and
    interdigitated fingers coupled to said strip.

6. A method to determine arrival direction of an electromagnetic signal having a signal frequency and a signal wavelength, comprising the steps of:
- with an antenna configured to define, at said signal frequency, at least one metamaterial cell between first and second signal ports, noting a differential power that is defined as the difference between received powers from said first and second ports; and
- determining said arrival direction from said differential power.

7. The method of claim 6, further including the step of defining said metamaterial cell as:
- first and second resonant circuits arranged in series between said first and second ports and configured to each be resonant at a center frequency that differs from said signal frequency; and
- a third resonant circuit coupled in shunt between said first and second resonant circuits and configured to be resonant at said center frequency.

8. The method of claim 6, wherein said metamaterial cell has a dimension between said first and second ports less than one fourth of said signal wavelength.

9. The method of claim 8, further including the step of defining said metamaterial cell as a mircrostrip circuit having a substrate with a thickness and a dielectric constant to define said wavelength and wherein said first, second and third resonant circuits each comprise:
- a metallic strip disposed over said dielectric; and
- a varactor diode coupled to said strip.

10. The method of claim 8, further including the step of defining said metamaterial cell as a mircrostrip circuit having a substrate with a thickness and a dielectric constant to define said wavelength and wherein said first, second and third resonant circuits each comprise:
- a metallic strip disposed over said dielectric; and
- interdigitated fingers coupled to said strip.

11. The method of claim 6, wherein said determining step includes the steps of:
- receiving electromagnetic signals at said antenna from different arrival directions; and
- measuring said differential power for each of said arrival directions.

12. A method to use an antenna to determine arrival direction of an electromagnetic signal having a signal frequency and a signal wavelength, comprising the steps of:
- arranging an antenna to define, at said signal frequency, at least one metamaterial cell between first and second signal ports to thereby note a differential power that is the difference between received powers from said first and second ports; and
- with said antenna, determining said arrival direction from said differential power.

13. The method of claim 12, further including the step of arranging said metamaterial cell as:
- first and second resonant circuits arranged in series between said first and second ports and configured to each be resonant at a center frequency that differs from said signal frequency; and
- a third resonant circuit coupled in shunt between said first and second resonant circuits and configured to be resonant at said center frequency.

14. The method of claim 12, wherein said metamaterial cell has a dimension between said first and second ports less than one fourth of said signal wavelength.

15. The method of claim 14, wherein said metamaterial cell is a mircrostrip circuit having a substrate with a thickness and a dielectric constant to define said wavelength and wherein said first, second and third resonant circuits each comprise:
- a metallic strip disposed over said dielectric; and
- a varactor diode coupled to said strip.

16. The method of claim 14, wherein said metamaterial cell is a mircrostrip circuit having a substrate with a thickness and a dielectric constant to define said wavelength and wherein said first, second and third resonant circuits each comprise:
- a metallic strip disposed over said dielectric; and
- interdigitated fingers coupled to said strip.

17. The method of claim 12, wherein said determining step includes the steps of:
- receiving electromagnetic signals at said antenna from different arrival directions; and
- measuring said differential power for each of said arrival directions.

* * * * *